United States Patent Office 3,227,985
Patented Jan. 4, 1966

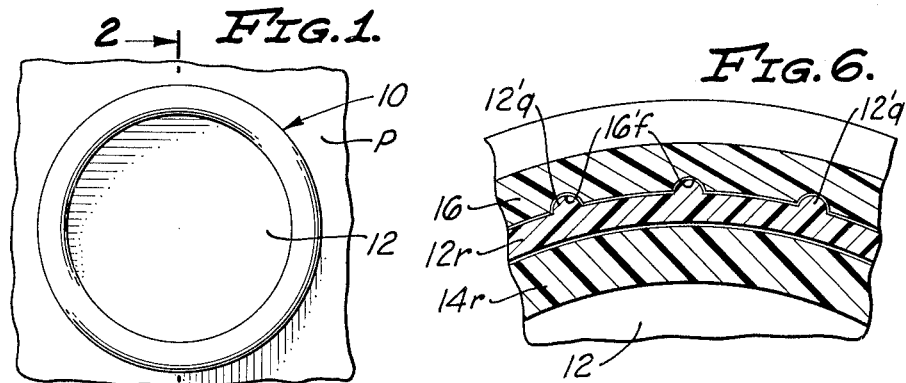
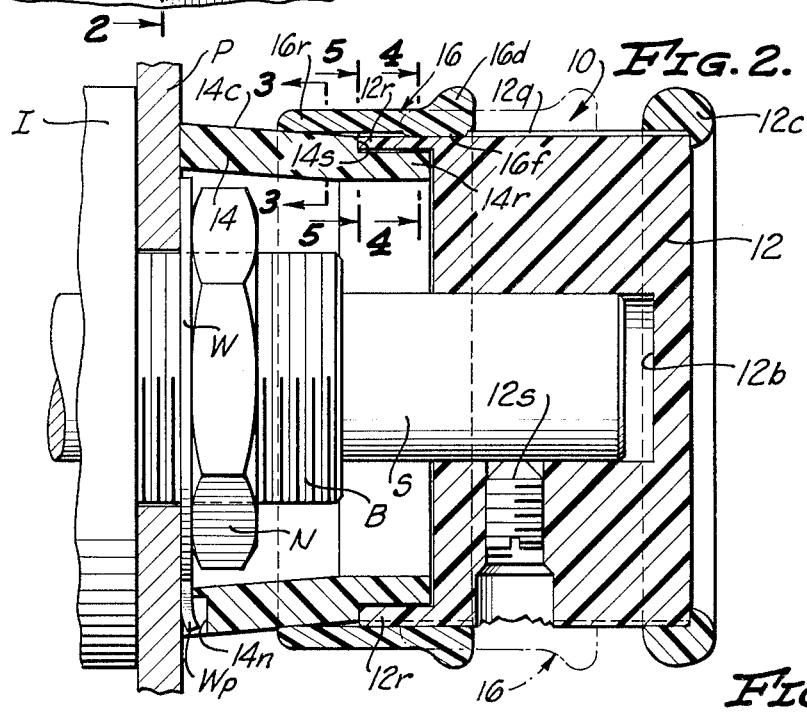
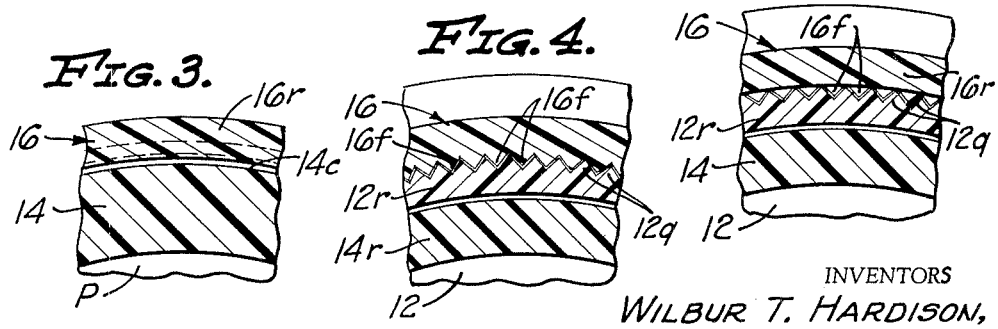
INVENTORS
WILBUR T. HARDISON,
WYLIE A. STOUT

3,227,985
ROTARY INSTRUMENT BRAKE
Wilbur T. Hardison, Riverside, and Wylie A. Stout, Arlington, Calif., assignors to Bourns, Inc., a corporation
Filed Jan. 21, 1963, Ser. No. 252,903
10 Claims. (Cl. 338—162)

The invention herein disclosed relates to manually adjustable rotary instruments that are adjustable over a range of operating positions or attitudes by rotation of an adjusting shaft; and more particularly to brake means alternatively effective to release the instrument for rotational adjustment or to lock the instrument against rotation. Potentiometers, capacitors, and like instruments are included in the class of instruments comprising a rotatable adjusting shaft employed for effecting the noted adjustment. In a large percentage of applications of such instruments, the adjusting shaft is provided with a knob by means of which the shaft is manually rotated to effect adjustment of the instrument; and it is to that class of instruments that the present invention is particularly directed.

In most environments in which instruments of the class here of concern are used, locking of the instrument is not of importance, and an ordinary knob is employed on the adjusting shaft for effecting adjustments. In environments where severe vibration is or may be encountered, it is known to provide contractile wedge brake devices with tapered nut means including lock nuts, to secure the adjusting shaft against undesired rotation. Also it is known to provide, in conjunction with indicating dials for such instruments, lever-operated pinch devices. The mentioned devices, and others known in the art, are characterized by one or more disadvantages such as being complex, or comprised of many parts, or being expensive to produce, or not easy to apply and remove from instruments.

The present invention avoids the mentioned disadvantages and provides a simple, inexpensive, easily applied and removed device that replaces the usual knob and comprises only a very few parts. In general the device comprises a stationary member, preferably a stationary cylinder having a tapered conical surface, a knob-like member adapted to be secured to the adjustment shaft of the instrument and arranged to hold the cylinder in place against a panel or other surface on which the instrument is mounted, and a slidable band slidably supported on the knob-like member and which when moved outwardly disengages from the stationary cylinder and permits the knob-like member to be rotated; but which when moved inwardly toward the panel, frictionally engages the stationary cylinder and releasably secures the knob-like member to the cylinder.

The preceding brief general description makes it evident that a prime object of the invention is to provide improvements in rotary instrument brakes.

Another object of the invention is to provide a simple rotary instrument brake device.

Another object of the invention is to provide for an adjustable rotary instrument a knob device for the shaft of the instrument, having a brake or lock for preventing unintentional rotation of the shaft.

Another object of the invention is to provide an easily applied and easily removed rotary instrument brake.

Other objects of the invention will hereinafter be set out in the appended claims or made apparent in the following description of a preferred embodiment of the invention as illustrated in the accompanying drawings in which:

FIGURE 1 is a face view of a preferred physical embodiment of the invention as applied to the adjusting shaft of a rotary instrument mounted on a console panel;

FIGURE 2 is a longitudinal sectional view taken as indicated by broken line 2—2 of FIGURE 1;

FIGURE 3 is a fragmentary sectional view of parts of the device depicted in part in FIGURE 2 and taken as indicated by broken line 3—3 of FIGURE 2;

FIGURE 4 is a fragmentary sectional view of parts of the device depicted in part in FIGURE 2 and taken as indicated by broken line 4—4 of FIGURE 2;

FIGURE 5 is a fragmentary sectional view similar to FIGURE 4 but taken as indicated by broken line 5—5 of FIGURE 2; and FIGURE 6 is a fragmentary view similar to FIGURE 4 but illustrating a modified form of complementary fluting useful for the interengaging surfaces of the brake band and the knob member of the invention.

Referring now to FIGURE 1, there is designated generally by reference numeral 10 a device according to the invention, as mounted on and supported by the adjustment shaft of an instrument supported by and mounted on a panel P. As is indicated in FIGURE 2, the instrument, I, comprises an adjustment shaft S that is rotatable in a threaded mounting bushing B that extends through an aperture in a panel P. The instrument is secured to the panel by a nut N and washer W that are mounted on the bushing and drawn tight in a manner widely known in the arts. The previously denominated instrument parts are, with the exception of washer W, well known in the art and are not per se of the present invention.

As depicted in FIGURE 2, according to the present invention there is provided a recessed generally cylindrical knob-like rotatable member 12, hereinafter called a knob in the interest of brevity and convenience, which knob is provided with a bore 12b for reception of the shaft S of the instrument. Knob 12 is also provided with a transversely disposed tapped bore for reception of a setscrew 12s, as indicated, whereby the knob is secured to the shaft. Also there is provided a stationary means in the form of a cylindrical sleeve 14 adapted and arranged to abut against the front face of panel P as indicated and to be held thereagainst by force exerted by knob 12. As is indicated in the drawing, sleeve 14 is formed with an outwardly-extending portion 14r of reduced diameter, which provides an annular radial shoulder 14s. A rearwardly-extending annular lip 12r formed as a part of knob 12, closely encircles portion 14r of sleeve 14 and thus positions the sleeve in substantially coaxial relationship with shaft S. The annular rear surface of lip 12r of the knob presses against shoulder 14s and holds sleeve 14 against panel P.

Sleeve 14 is prevented from rotating as knob 12 is rotated, by suitable means such as a radial projection or tongue Wp formed as a part of washer W, the projection fitting closely in a recess or notch 14n provided in the rear edge of the sleeve as depicted. It is evident that in installing the device of the invention on the instrument shaft, sleeve 14 is held with portion 14r inside lip 12r, and the device is pressed onto shaft S until sleeve 14 abuts against panel P, following which placement the setscrew 12s is tightened. During such assembly only moderate rearward force is applied to the knob, so as to avoid binding friction between shoulder 14s and the rear face of lip 12r.

The outer periphery of knob 12 is formed as a longitudinally serrated or fluted surface of a right cylinder. As indicated in FIGURE 4, the fluting is in the form of regular milling or serrations 12q; however, and as depicted in FIGURE 6, the longitudinal fluting may consist of regularly spaced outwardly projecting ribs 12′q. Such fluting or serrations provide a good surface for manual gripping, and also serve an additional purpose as presently will be explained.

Slidably supported upon the fluted annular exterior surface of knob 12, and closely encircling the same, is an annular band 16 of stiff but slightly elastic material. While the band 16 may be of many differing cross-sectional shapes as dictated by circumstances and desires of the user, as shown in exemplary form in FIGURE 2, the band comprises a rear portion 16r of plain cylindrical form and a beaded front portion 16d that is provided with a serrated or fluted internal periphery 16f the fluting of which is complementary with that of the encircled knob. The complementary nature of the external fluting of knob 12 and the internal fluting of band 16 is illustrated in FIGURES 4 and 6. Thus, while band 16 may be slid forwardly and rearwardly on the knob 12, from the full-line position to the dotted-line position indicated in FIGURE 2, the band is prevented from rotating on the knob relative to the latter.

Sleeve 14 is provided with a tapered or conical exterior surface 14c (FIGURE 2) extending rearwardly from shoulder 14s. At the forward end, surface 14c is of diameter slightly less than that of the outer cylindrical surface of lip 12r of the knob, and slightly less than the internal diameter of the rear portion 16r of band 16, as is indicated in FIGURE 2. At its rear end or base, surface 14c is of diameter somewhat greater than the internal diameter of the plain cylindrical portion 16r of band 16, as depicted. Thus, as band 16 is pressed rearwardly from the dotted-line position or attitude toward the full-line position, the interior rear surface of the band comes into frictional engagement with the conical surface 14c of the stationary sleeve and grips the latter. The degree or tightness of the grip obviously is dependent upon the extent of rearward motion of the band 16. Since relative rotation between band 16 and knob 12 is, in all positions of the band, prohibited by firm interengagement of the complementary serrations 12q and 16f (or 12′q and 16′f, in the modified form illustrated in FIGURE 6), it is evident that with the band pressed firmly into engagement with sleeve 14, the knob 12 is locked against rotation. Also, it is evident that the brake thus applied is readily released by manually drawing band 16 forwardly out of engagement with sleeve 14.

In the exemplary embodiment of a device according to the invention illustrated in FIGURE 2, the external longitudinally-extending serrations provided on knob 12 extend throughout the length of the knob. Thus the band 16 may be applied on either end of knob 12 prior to assembly of the device as a whole. To obviate inadvertent removal of band 16 from the knob 12, a firmly adherent decorative cap or ring 12c may be applied over and around the forward end of knob 12 as shown. Obviously, if it is desired to also prevent easy but purposeful and undesired removal of band 16, ring 12c may be permanently attached to knob 12 by adhesive or other suitable means. Further, if desired, the cap formed by ring 12c may be formed as an integral part of the knob in those cases wherein removal or replacement of band 16 is not important.

Preferably, but not necessarily, knob 12 and band 16 are made of synthetic thermosetting or thermoplastic resin compound, such as diallyl phthalate or the like, with or without filler reinforcing material such as fiberglass. Sleeve 14 is preferably formed of a material providing good frictional interengagement with band 16, and hence may be a resin compound with a suitable filler such as glass or the like. Obviously other materials may be employed, depending upon cost and environmental conditions in which the device is to be used. Further, if desired, the tapered or conical surface 14c of sleeve 14 may be longitudinally serrated whereby to provide a firmer locking engagement of the band 16 therewith. Alternatively, surface 14c of the sleeve 14 may be relatively smooth, and the interior surface of the rear portion 16r of band 16 may in that case be serrated or ribbed in a fashion similar to or like the forward portion 16f, whereby good frictional grip is attained. As is evident, the fluted exterior surface may be provided on sleeve 14 and the tapered surface on knob 12 (with the taper reversed), and band 16 arranged to be positioned on the sleeve when in the released attitude, in a reversal of the locking arrangement and action.

The band 16 may be colored, whereby to designate or indicate particular factors or functions in connection with the instrument with which it is used, and in this respect it is evident that the feature of easy removal of cap 12c and ready replacement by a band of another color is of value in the art in facilitating such indications and changes thereof. The preceding description makes evident that the aforementioned objects of the invention have been attained by the disclosed device. Basically the device is a simple, easily assembled combination of three principal parts that are inexpensive and provide a very effective means for manually adjusting a rotary instrument and for locking the instrument against unintended change of adjustment. In the light of the foregoing disclosure of a preferred exemplary embodiment of the invention, modifications and changes within the spirit and scope of the invention will occur to others, and accordingly we do not wish to limit the invention to exact details of the illustrated embodiment, but we claim:

1. A device adapted for use in manually adjusting and locking the rotary adjustment shaft of a rotary instrument adapted to be mounted outwardly of a panel or the like, said device comprising:
   first means, comprising a knob-like structure arranged for secure attachment to the instrument shaft outwardly of such panel or the like for rotation of the shaft incident to manual rotation of said structure, said knob-like structure having a longitudinally fluted substantially cylindrical exterior surface;
   second means, comprising a sleeve-like member arranged generally coaxial with said knob-like structure and presenting a tapered exterior surface as a continuation of the fluted exterior surface of said knob-like structure, said second means comprising means for preventing rotation of said sleeve-like member; and
   third means, comprising an annular sleeve-like band disposed on said fluted exterior surface of said knob-like structure and having an internal surface including a serrated surface interengaged with and complementary to the fluted surface of said knob-like structure whereby the band is constrained in all positions to rotate in unison therewith and is longitudinally slidable thereon to and from a position at which at least a portion of said internal surface frictionally engages said tapered exterior surface,
   whereby said band is alternatively effective to frictionally lock said knob-like structure to said sleeve-like member when frictionally engaged with said tapered exterior surface or effective to permit free rotation of the knob-like structure when disengaged from said tapered exterior surface.

2. A device according to claim 1, said sleeve-like member having an annular radial surface engaged by a complementary annular surface provided on said knob-like member, whereby said sleeve-like member is retained in position by said knob-like structure.

3. A device adapted for use in manually rotating and locking against rotation the rotatable adjustment shaft of a rotary instrument, said device comprising:
   means including first and second members one of which has a substantially cylindrical annular surface and the other of which has a slightly tapered annular surface of substantially circular right section and one diameter of which is less than that of said one member and another diameter of which is greater than that of said one member, one of said members being stationary and another of said members being rotatable about the axis of the adjustment shaft of the instrument, one of said members having a longitudinally-ribbed peripheral surface of appreciable length, and said means including means causing the rotatable one of said members to be secured to such shaft for rotation in unison therewith; and a third member of generally annular sleeve-like configuration, said third member having a longitudinally-ribbed generally annular surface complementary to the said longitudinally-ribbed peripheral surface of appreciable length and arranged for interengagement with the latter surface to prevent relative rotation therebetween when in interengaging relationship, and said third member having a plain annular surface and said third member being longitudinally slidable parallel to the axis of such shaft of the instrument to and from a position in which said third member engages both of said first and second members and the said tapered annular surface and thereby locks the rotatable one thereof to the stationary one thereof to lock the rotatable one of said members against rotation, from and to a position in which said third member engages one only of said members and frees the rotatable one thereof for free rotation relative to the stationary one of said members.

4. A device according to claim 3, in which said second member bears said longitudinally ribbed external annular surface and in which said first member bears said slightly tapered annular surface, and in which said third member bears a plain cylindrical inner surface arranged for longitudinal movement to and from engagement with said tapered annular surface and further bears a longitudinally-ribbed internal annular surface complementary to and bearing on the longitudinally-ribbed external annular surface of said second member.

5. A device according to claim 3, comprising a fourth member secured to the said second member for rotation therewith and constructed and arranged to limit longitudinal sliding movement of said third member in the direction away from engagement with both of said first and second members whereby to reduce likelihood of inadvertent removal of said third member from engagement with one or both of said first and second members.

6. A rotary instrument brake device adapted for use with a rotary instrument having an adjustment shaft rotatable about its axis to effect adjustment of the instrument, said device comprising:

first means, comprising stationary means arranged for coaxial mounting relative to the axis of the instrument shaft and said stationary means having a rear portion and a front portion having a generally conical slightly tapered annular surface of rearwardly increasing diameter;

second means, comprising rotatable means arranged for attachment to the instrument adjustment shaft for coaxial rotation in unison therewith; and third means, comprising a slidable member having an annular substantially cylindrical surface and mounted upon and longitudinally slidable on and coaxial with said rotatable means and engaging the latter for positive rotation therewith and having a substantially cylindrical surface, said slidable member being movable longitudinally on said rotatable means from a position out of engagement with said tapered annular surface into a position in frictional engagement with at least a portion of said tapered annular surface, whereby said slidable member serves as a releasable brake capable of alternatively releasing said rotatable means for free rotation or engaging said stationary means and effectively braking said rotatable means against unintended rotation.

7. A rotary instrument brake device according to claim 6, wherein said rotatable means is of the configuration of a manually rotatable knob adapted for manual rotation and thereby effective to rotate the instrument shaft.

8. A brake device for an instrument having a rotary knob-like structure having an axis and arranged for manual rotation about its axis to effect adjustment of the instrument, and said structure having a substantially cylindrical surface, the combination with said knob-like structure, comprising:

first means, including stationary means having a slightly tapered conical annular surface coaxial with the said substantially cylindrical surface of said knob-like structure and with the axis of said structure; and second means, including a member comprising a sleeve like annular band portion disposed on and frictionally engaging said substantially cylindrical surface of said knob-like structure and manually movable axially to and from a position wherein the said band frictionally engages both said cylindrical surface and said conical annular surface and frictionally locks the said surfaces against easy relative rotation, whereby said band when in engagement with one only of said surfaces of said knob-like structure and said stationary means permits easy rotation of said knob-like structure relative to said stationary means and when in engagement with both of the said surfaces effectively locks said knob-like structure to said stationary means to prevent unintended change of setting of the instrument.

9. A brake device according to claim 8, wherein one of said substantially cylindrical and conical surfaces is longitudinally serrated and the other thereof is relatively smooth.

10. A brake device for an instrument having an adjustment shaft arranged to extend through an aperture in a stationary structure and rotatable about the axis of the shaft to effect adjustment of the instrument, said device comprising:

means, including first and second members, each of said members having an axis and arranged in coaxial juxtaposition and arranged to be in coaxial relation to the shaft of such instrument, one of said members being arranged to be secured to the shaft of the instrument to rotate with the shaft, and the other of said members being constructed and arranged to engage such stationary structure to be held thereby against rotation about the axis of the instrument shaft, the first member of said first and second members comprising a slightly conical annular surface and the second member of said first and second members having a supporting surface arranged to encircle the shaft axis and be disposed parallel thereto;

and means, including a third member having an axis and adapted to be disposed in coaxial relationship with said first and second members, said third member having a surface complementary to said supporting surface of said second member and supported thereby for longitudinal axial sliding movements on said supporting surface but thereby prevented from rotation relative to said second member and said third member having a surface disposed around said axis and arranged to be moved into frictional engagement with said conical surface and to grip the latter incident to axial movement theretoward whereby to lock said first member and said second member against relative rotation to thereby prevent rotation of such instrument shaft to which said one of said first and second members may be secured.

(References on following page)

References Cited by the Examiner

UNITED STATES PATENTS

| | | | |
|---|---|---|---|
| 865,558 | 6/1907 | Voight | 292—359 |
| 2,502,915 | 4/1950 | Atkins et al. | |
| 2,509,058 | 5/1950 | Haury | 338—162 |

FOREIGN PATENTS 579,370  7/1958  Italy.

ANTHONY BARTIS, *Acting Primary Examiner.*
RICHARD M. WOOD, *Examiner.*
R. F. STAUBLY, *Assistant Examiner.*